US012438269B2

(12) United States Patent
Henderson

(10) Patent No.: US 12,438,269 B2
(45) Date of Patent: Oct. 7, 2025

(54) SCANNING TRUE TIME DELAY ARRAY ANTENNA

(71) Applicant: ThinKom Solutions, Inc., Hawthorne, CA (US)

(72) Inventor: William Henderson, Lomita, CA (US)

(73) Assignee: THINKOM SOLUTIONS, INC., Hawthorne, CA (US)

( * ) Notice: Subject to any disclaimer, the term of this patent is extended or adjusted under 35 U.S.C. 154(b) by 71 days.

(21) Appl. No.: 18/597,187

(22) Filed: Mar. 6, 2024

(65) Prior Publication Data

US 2024/0304986 A1 Sep. 12, 2024

Related U.S. Application Data

(60) Provisional application No. 63/450,253, filed on Mar. 6, 2023.

(51) Int. Cl.
*H01Q 3/26* (2006.01)
*H01Q 15/24* (2006.01)

(52) U.S. Cl.
CPC ........... *H01Q 3/2682* (2013.01); *H01Q 15/24* (2013.01)

(58) Field of Classification Search
CPC ...... H01Q 3/005; H01Q 3/242; H01Q 3/2682; H01Q 3/30; H01Q 3/32
See application file for complete search history.

(56) References Cited

U.S. PATENT DOCUMENTS 5,945,946 A * 8/1999 Munger .................. H01Q 3/46 343/754
7,656,345 B2 * 2/2010 Paschen .................. H01Q 3/04 342/75

(Continued)

FOREIGN PATENT DOCUMENTS

CN 109524785 B 3/2021

OTHER PUBLICATIONS

Extended European Search Report dated Jul. 19, 2024 in related/corresponding European Patent Appl. No. 24161849.5.

(Continued)

*Primary Examiner* — Jason M Crawford
(74) *Attorney, Agent, or Firm* — RENNER, OTTO, BOISSELLE & SKLAR, LLP

(57) ABSTRACT

A scanning true time delay antenna includes a first layer including at least one first corporate feed having a first port and a plurality of second ports communicatively coupled to the first port, and a second layer disposed over the first layer and rotatable relative to the first layer. The second layer includes a plurality of second corporate feeds each having a third port and a plurality of fourth ports communicatively coupled to the respective third port, and a plurality of radiators, wherein each of the plurality of radiators is communicatively coupled to a respective one of the plurality of fourth ports. A plurality of first variable time delay lines are arranged at least partially in at least one of the first layer or the second layer, wherein each of the plurality of second ports is communicatively coupled to a respective one of the plurality of first variable time delay lines, and each third port is communicatively coupled to a respective one of the plurality of first variable time delay lines. Rotation of the second layer relative to the first layer creates a linear (Continued)

progressive length change from the first port to each of the radiators.

21 Claims, 13 Drawing Sheets

(56) References Cited

U.S. PATENT DOCUMENTS

| | | | | |
|---|---|---|---|---|
| 9,653,801 | B2 * | 5/2017 | Milroy | H01Q 3/04 |
| 9,972,915 | B2 * | 5/2018 | Milroy | H01Q 21/0025 |
| 2002/0075194 | A1 * | 6/2002 | Sikina | H01Q 21/064<br>343/757 |
| 2012/0177376 | A1 * | 7/2012 | Chang | H01Q 3/12<br>398/115 |
| 2018/0069321 | A1 * | 3/2018 | Milroy | H01Q 15/24 |
| 2024/0304986 | A1 * | 9/2024 | Henderson | H01Q 21/0081 |

OTHER PUBLICATIONS

Sanchez-Escuderos, et al. "True-Time-Delay Mechanical Phase Shifter in Gap Waveguide Technology for Slotted Waveguide Arrays in Ka-Band," in *IEEE Transactions on Antennas and Propagation*, vol. 69, No. 5, pp. 2727-2740, May 5, 2021.

* cited by examiner

MEASURED ANTENNA PATTERN (EXPRESSED AS A $K_x K_y$ PLOT)
@ 18.7 GHz WITH BEAM SCANNED TO 33 FROM BORESIGHT

SCANNING TRUE TIME DELAY ARRAY ANTENNA

RELATED APPLICATIONS

This application claims the benefit of U.S. Provisional Application No. 63/450,253 filed Mar. 6, 2023, which is hereby fully incorporated herein by reference.

TECHNICAL FIELD

The present invention relates generally to antennas, and more particularly, to a directive true time delay antenna having multiple independently-rotatable layers.

BACKGROUND ART

Existing phased array antennas have a limited instantaneous bandwidth, which is the frequency range over which the antenna may operate at any instant in time. A phased array antenna's tuneable bandwidth is the full frequency range over which the antenna can operate. To cover the full tuneable bandwidth, settings (e.g., phase shift values) of the antenna need to be altered and, thus, the antenna cannot operate over the full tuneable range at any instant in time. For phased array antennas, the instantaneous bandwidth is always less than the tuneable bandwidth and, for many applications, the relatively small instantaneous bandwidth of phased arrays is a significant limitation.

Conventionally, one approach for mitigating the effects of limited instantaneous bandwidth of phased array antennas is to employ very fast phase control. However, fast phase control still does not provide true instantaneous bandwidth, particularly when multi-carriers (simultaneous multiple frequencies) and/or spread-spectrum (extremely broad channel) bandwidths are employed. Another approach for improving the instantaneous bandwidth of phased array antennas is to divide the antenna into multiple subarrays and employ variable time delay between subarrays. Such approach adds complexity and increases costs.

SUMMARY OF INVENTION

A device and method in accordance with the invention implements all beam steering of a phased array antenna with a combination of time delay and azimuth rotation. The device and method in accordance with the invention can provide instantaneous bandwidths that conventionally can only be achieved with fixed beam antennas (e.g., gimbaled flat plate antennas or dishes.)

An antenna in accordance with the invention includes at least two independently rotatable layers. Differential rotation of the layers causes the beam to scan in the Θ direction, while rotation of the layers in unison causes the beam to scan in the ϕ direction (where Θ and ϕ are the parameters of a standard spherical coordinate system with Θ=0 normal to the face of the antenna).

As the upper layer is rotated over the lower layer, multiple concentric RF transmission lines contained in one or both layers change in length, with the innermost transmission line exhibiting the smallest change in length and the outermost transmission line exhibiting the largest change in length (each proportionate to its radial distance from the center of the layers), each forming a separate variable time delay line within the phased array. Each variable delay line feeds a column of radiating elements of the phased array via a corporate feed network, such that when the upper (aperture) layer is rotated over the lower layer, the ensemble of variable delay lines together form a coherent time delay gradient across the columns of the phased array causing the array to scan in the Θ direction (elevation) by an amount that is a simple monotonic function of the amount of differential rotation of the layers.

According to one aspect of the invention, a scanning true time delay antenna includes: a first layer including at least one first corporate feed having a first port and a plurality of second ports communicatively coupled to the first port; a second layer disposed over the first layer and rotatable relative to the first layer, the second layer including a plurality of second corporate feeds each having a third port and a plurality of fourth ports communicatively coupled to the respective third port, and a plurality of radiators, wherein each of the plurality of radiators is communicatively coupled to a respective one of the plurality of fourth ports; and a plurality of first variable time delay lines arranged at least partially in at least one of the first layer or the second layer, wherein each of the plurality of second ports is communicatively coupled to a respective one of the plurality of first variable time delay lines, and each third port is communicatively coupled to a respective one of the plurality of first variable time delay lines, wherein rotation of the second layer relative to the first layer creates a linear progressive length change from the first port to each of the radiators.

In one embodiment, the antenna includes a plurality of transitions connecting each of the plurality of second ports to a respective one of the plurality of first variable time delay lines, the transitions operative to communicate a signal between each second port and the respective first variable time delay line.

In one embodiment, the transitions comprise a first set of transitions and a second set of transitions.

In one embodiment, the at least one first corporate feed comprises at least two corporate feeds angularly spaced apart from one another, wherein the first set of transitions is associated with one of the at least two first corporate feeds, and the second set of transitions is associated with another one of the at least two first corporate feeds.

In one embodiment, the first set of transitions and associated one of the at least two corporate feeds are tuned for a first frequency band, and the second set of transitions and the associated another of the at least two corporate feeds are tuned for a second frequency band different from the first frequency band.

In one embodiment, the antenna includes a power splitter arranged at each respective transition, the power splitter configured to direct half of the power from each of the plurality of second ports to propagate in a first direction along the respective one first variable time delay line, and to direct the other half of the power from each of the plurality of second ports to propagate in a second direction along the respective one first variable time delay line, the second direction different from the first direction.

In one embodiment, the at least two corporate feeds are configured to be independently placed in an active state or a dormant state to receive or transmit in one of the distinct frequency bands.

In one embodiment, the first and second set of transitions employ coaxial transmission lines or waveguides.

In one embodiment, the antenna includes a polarizer disposed over the second layer.

In one embodiment, the plurality of first variable time delay lines, the at least one first corporate feed, and the plurality of second corporate feeds are constructed from at least one of stripline, microstrip, and waveguide structures.

In one embodiment, the antenna includes a plurality of second variable time delay lines interleaved with the plurality of first variable time delay lines and wherein the upper layer includes a plurality of third corporate feeds interleaved with the plurality of second corporate feeds to provide simultaneous dual polarization.

In one embodiment, the antenna includes an antenna port arranged on the first layer, wherein the first port of the at least one first corporate feed is communicatively coupled to the antenna port.

In one embodiment, the plurality of first variable time delay lines radially span from the center of the antenna toward a perimeter of the antenna.

In one embodiment, the plurality of first variable time delay lines are at least partially contained within the first layer and at least partially contained within the second layer.

In one embodiment, the plurality of first variable time delay lines are fully contained within one of the first layer or the second layer.

In one embodiment, the plurality of first variable time delay lines are formed as stripline, microstrip, or waveguides.

In one embodiment, the plurality of first variable time delay lines comprise a first conductive groove formed in the first layer and a second conductive groove formed in the second layer, the first and second grooves facing each other and aligned with each other to define a channel.

In one embodiment, the antenna includes an air gap disposed between the first layer and the second layer.

In one embodiment, each of the plurality of second ports is communicatively coupled to a single column of radiators.

In one embodiment, each one of the plurality of second feeds and the radiators coupled to the respective second feed forms a column of radiators.

According to another aspect of the invention, a method of implementing scanning true time delay using an antenna having a first layer and a second layer rotatable relative to the first layer, the first layer including an antenna port and a first corporate feed and the second layer including a plurality of second corporate feeds and a plurality of radiators, each second corporate feed comprising a column of radiators, the method including: receiving a signal at the antenna port of the first layer; communicating the received signal to the plurality of radiators of the second layer through the first corporate feed and the plurality of second corporate feeds, the first corporate feed coupled to the plurality of second corporate feeds through a plurality of first variable time delay lines formed in at least partially in one of the first layer or the second layer; and rotating the second layer relative to the first layer to alter the delay time from the antenna port to each of the plurality of radiators.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

Figure 1:
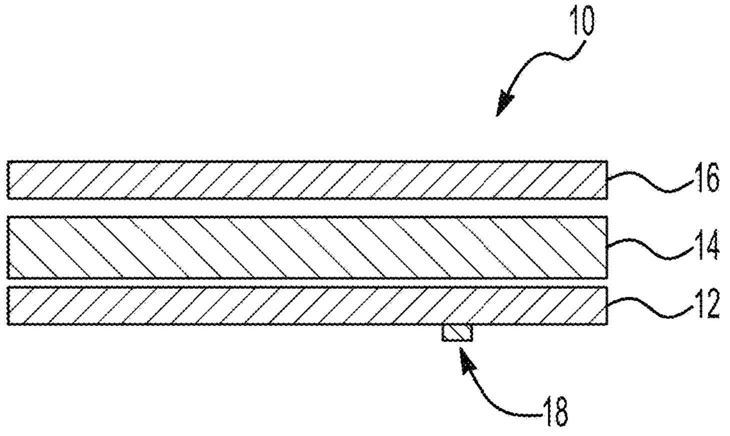
FIG. 1 is a side view of an exemplary antenna in accordance with the invention illustrating the layers/sections of the antenna.

Embodiments of the present invention will now be described with reference to the drawings, wherein like reference numerals are used to refer to like elements throughout. It will be understood that the figures are not necessarily to scale.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

Figure 2:
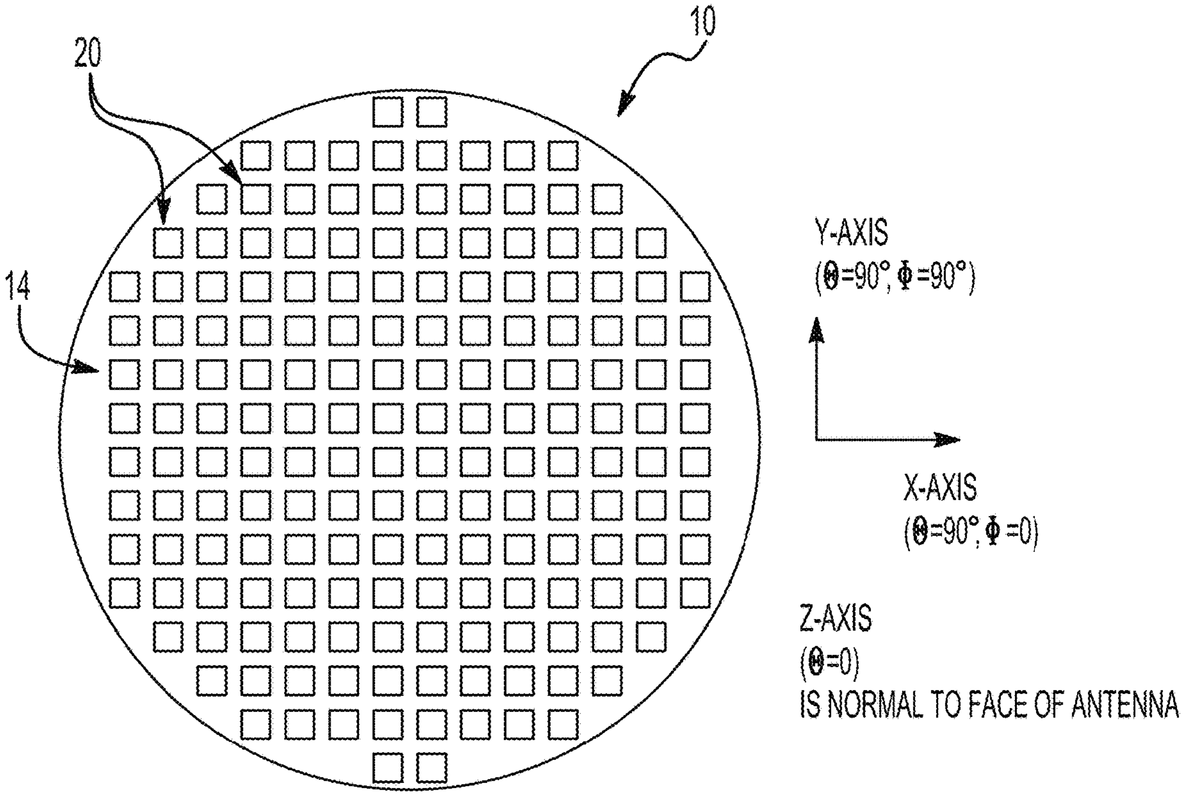
FIG. 2 is a top view of the antenna of FIG. 1

Referring initially to FIGS. 1-2, illustrated is an exemplary scannable true time delay (TTD) antenna 10 in accordance with the invention. FIGS. 1 and 2 illustrate simplified side and top views of the antenna 10. As best seen in FIG. 1, the antenna 10 includes a first (lower) layer 12, a second (upper) layer 14, an optional polarizer 16 arranged over the upper layer 14, and an antenna port 18 arranged on the lower layer 12. As discussed in more detail below, in the exemplary embodiment of FIGS. 1 and 2 the lower layer 12 includes a lower feed network and at least part of a variable true time delay structure, while the upper layer includes at least part of the variable true time delay structure, an upper feed network, and radiators 20 arranged on the top surface (i.e. the surface closer to the polarizer) of the upper layer 14. The upper and lower layers are typically comprised primarily of conducting materials manufactured with appropriate shapes to realize the required transmission lines, power dividers and radiators. Some dielectric materials may be used as well to realize stripline or microstrip circuits and interconnects.

Figure 3A:
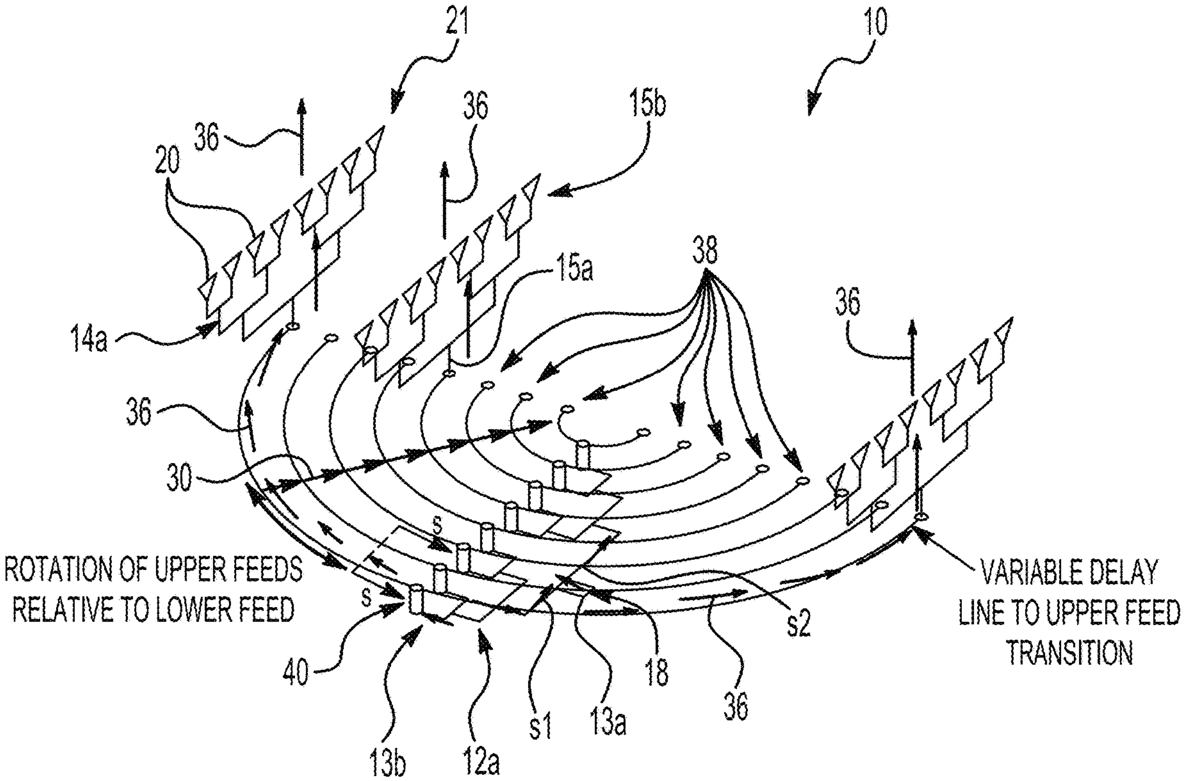
FIG. 3*a* illustrates the basic architecture of the antenna of FIG. 1.

With additional reference to FIG. 3*a*, the general architecture of the antenna 10 in accordance with the invention is illustrated schematically. More specifically, the lower layer 12 contains a fixed corporate feed (i.e. a network of power dividers) 12*a* having a first port 13*a* communicatively coupled to the antenna port 18, and a plurality of second ports 13*b* communicatively coupled to the first port. As shown in FIG. 3*a*, the line length between segments of the corporate feed 12*a* are intentionally different to introduce different fixed delays (e.g., segment s1 is different from segment s2). The upper layer 14 includes a plurality of fixed corporate feeds 14*a* each having a third port 15*a* and a plurality of fourth ports 15*b* communicatively coupled to the third port 15*a*, where each radiator 20 is communicatively coupled to a respective one of the fourth ports 15*b* of the corporate feed 14*a*. The combination of a fixed corporate feed 14*a* and its respective radiators is referred to as a column of radiators 21. For clarity, only three fixed corporate feeds and associated radiators (three columns of radiators) are shown in FIG. 3*a*, but it will be appreciated that there may be more than three corporate feeds 14*a*. The optional polarizer 16, which is disposed over the second layer, can be used to convert the polarization provided by the radiators 20 to a different polarization. Many different types of radiators 20 may be utilized, including, but not limited to patch, slot, and notch type radiators.

The antenna 10 also contains variable time delay lines 30 that radially span from a center of the antenna toward an outer edge of the antenna 10. In one embodiment, the time delay lines 30 are partially contained in the lower layer 12 and partially contained in the upper layer 14. For example, and briefly referring to FIG. 3*b*, which is a sectional view of the antenna 10 taken along section line S-S in FIG. 3*a*, the time delay lines 30 may be split such that a portion, (e.g., one half, one quarter, etc.) of the time delay lines 30 are in the upper layer 14 and another portion (e.g., one half, three quarters, etc.) of the time delay lines 30 are in the lower layer 12. In this regard, a first conductive groove 30*a* may be formed in the lower layer 12 and a second conductive groove 30*b* may be formed in the upper layer 14, the first and second grooves facing each other and being aligned with each other to define a channel. An air gap 32 (which is typically smaller than one tenth of a wavelength) is formed between the lower layer 12 and upper layer 14 to enable relative rotation between the two layers, and a circuit board 33 having metal traces 34 is disposed on the upper layer 14 adjacent to the air gap 32. The combination of grooves 30*a*, 30*b* (which define a channel) and metal traces 34 form the variable time delay lines, each variable time delay line coupled to a respective second port 13*b* of the lower fixed corporate feed 12*a* of the lower layer 12, and coupled to a third port 15*a* of each upper corporate feed 14*a* of the upper layer 14. In another embodiment, the variable delay lines 30 are fully contained in either the upper or lower layers 12, 14. In yet another embodiment, the variable delay lines 30 are formed as waveguides in one or both of the lower layer 12 and/or the upper layer 14. The time delay lines 30 may be TEM (transverse electromagnetic mode) such as stripline or quasi-TEM transmission lines such as microstrip. As used herein, the term "stripline" refers to a single conductive "strip," electrically isolated from, enclosed and shielded within, and physically suspended or situated between conductive "ground planes" with the interstitial region(s) either homogenously or inhomogenously filled with dielectric substrate and/or air. Further, as used herein the term "microstrip" refers to a variant of a stripline, wherein the electrically-isolated conductive center strip is not fully enclosed, but rather is open to air in the half-space above and bounded by a (single) conductive ground plane below. Non-TEM mode lines such as waveguide or ridged waveguide could also be used in order to reduce loss, but this would reduce the instantaneous bandwidth.

Relative rotation between the lower layer 12 and upper layer 14 changes the time delay between the antenna port 18 and each column 21 of radiators 20, creating a linear time delay gradient in the X− direction, which causes the beam to scan in the θ direction. The relative angle of the two layers is defined as ψ. For $\psi=0$, all of the radiators are in phase, and $\theta=0$. The θ component of the beam's angle is given as a function of ψ by: $\theta=\sin^{-1}((K/K_0)\psi)$, where K is the propagation constant (2π/Wavelength) inside the variable delay lines, $K_0$ is the free space propagation constant and ψ is the relative angle between layers 12 and 14 expressed in radians. This feature of the antenna 10 in accordance with the invention can be seen in FIG. 3*a*, where the arrows 36 in FIG. 3*a* show the direction of signal propagation when the antenna 10 is transmitting. The variable delay lines 30 are arranged in a concentric array of circular arcs, and each of the connections 38 from a delay line 30 to the upper feed 14 (shown as small circles 38 in FIG. 3*a*) feeds one of the columns 21 of radiators 20. At the transitions 40 from the lower feed 12*a* to the delay lines 30 (the transitions shown as cylinders 40 in FIG. 3*a*), there is a power splitter (not shown) that directs half of the power from each output of the lower feed 12*a* so it propagates counterclockwise along a delay line 30, and directs the other half of the power from each output of the lower feed 12*a* so it propagates clockwise along the delay line 30. Thus, each output 13*b* of the lower feed 12*a* drives two columns 21 of radiators 20. Electrical choke features (not shown) can be used at the transitions 40 from the feeds to the variable delay lines 30. Fixed delay lines in the lower and upper feeds make the total path length from the antenna port 18 to each radiator 20 the same when ψ=0.

Figure 4A:
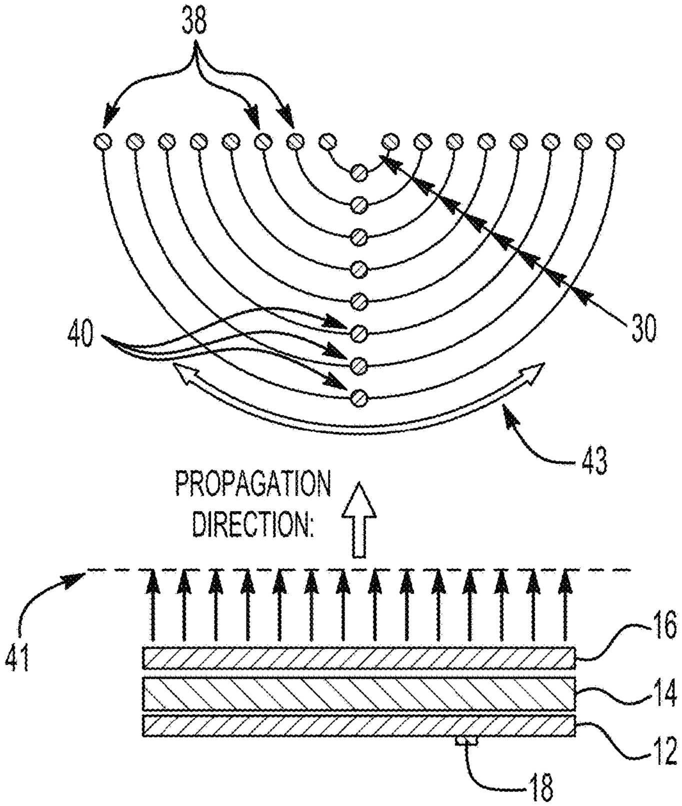
FIG. 4*a* illustrates the orientation of delay lines for boresight beam in accordance with a first embodiment of the invention that employs a power split at each launch point into the variable delay lines, and where fixed delay lines in lower and upper feeds, combined with the variable delay lines as shown, make the total path length to all radiators equal.
Figure 4B:
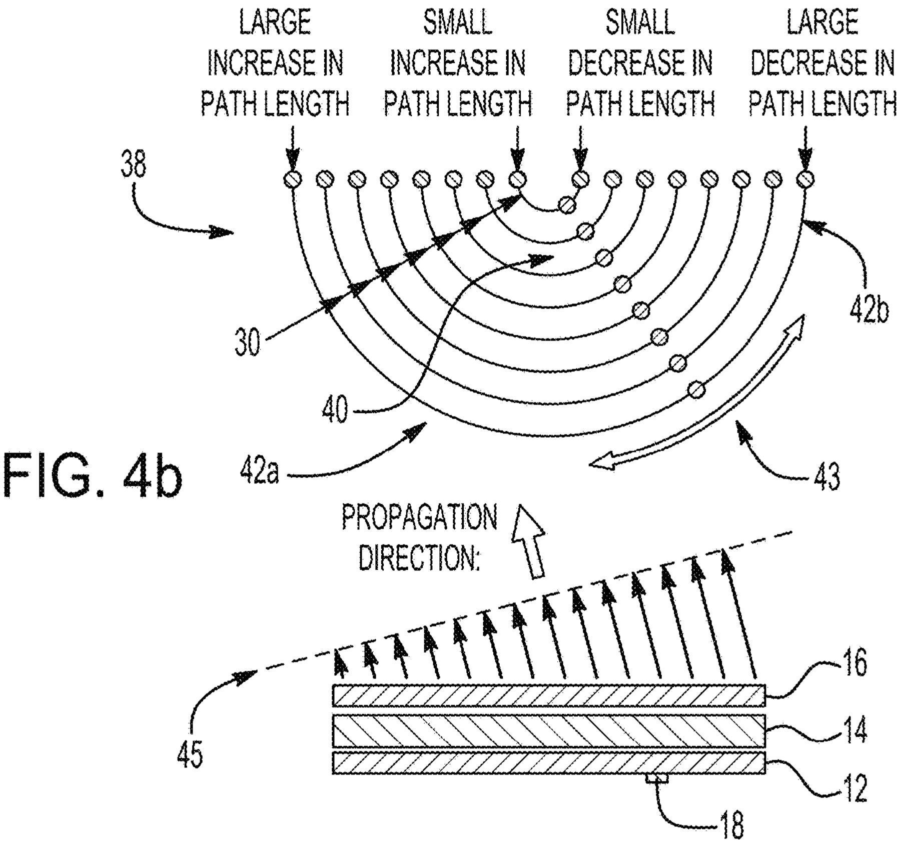
FIG. 4*b* illustrates the orientation of delay lines for scanned beam in accordance with the first embodiment that achieves equal power split, where physical rotation of the upper feed relative to the lower feed changes the path length to all radiators.

FIGS. 4*a* and 4*b* provide additional detail on the scanning mechanism of the antenna 10 in accordance with an embodiment of the invention in which there is equal power split at delay line transitions. FIG. 4*a* shows the orientation of delay lines for boresight beam, where fixed delay lines in the lower feed 12*a* and the upper feed 14*a* produce total path lengths that are equal to all radiators. In FIG. 4*a*, the connections from the delay lines 30 to the lower feed 12*a* (i.e., the transitions 40) are aligned perpendicular to the lower feed 12*a*, whereas the connections 38 from the delay lines 30 to the upper feeds 14*a* are aligned parallel to the upper feeds 14*a*. Further, the transmit signal is split into two directions 43 in the delay lines 30 (one traveling clockwise, the other counter-clockwise). Further, the lower layer 12 and upper layer 14 are oriented such that ψ=0, which, in combination with the total path length from the antenna port 18 (including fixed delay lines in the feeds; note that the path lengths in the lower feed shown in FIG. 3*a* are longer for paths feeding variable delay lines near the center than they are for paths feeding delay lines near the perimeter) to all radiators 20 being equal, causes all radiators 20 to be fed in phase with each other. This results in a radiated phase front 41 (transmit illustrated) that is parallel to the face of the antenna 10, which can be seen in the bottom portion of FIG. 4*a* The direction of radiation is therefore normal to the face of the antenna. FIG. 4*b* shows the orientation of delay lines for a scanned beam, where physical rotation of the upper layer 14 relative to the lower layer 12 results in a different path length for each delay line 30. In FIG. 4*b*, the connections from the delay lines 30 to the lower feed 12*a* (i.e., the transitions 40) are shifted right, resulting in a change in path length to the radiators. More specifically, the transmit signal is again split into two directions in the delay lines 30, but the upper layer 14 is oriented relative to the lower layer 12 such that ψ#0, thereby creating a linear progressive path length increment to the radiators 20. The longest path is formed on the left-most lines 42*a* and shortest path is formed on the right-most line 42*b*. The change in path length for the inner delay lines to the outer delay lines progressively increases or decreases, which causes the resultant radiation direction to be skewed to the left as shown in the bottom portion of FIG. 4*b*. (i.e., the radiated phase front 45 and the propagation direction are therefore tilted with respect to the antenna face).

Figure 5A:
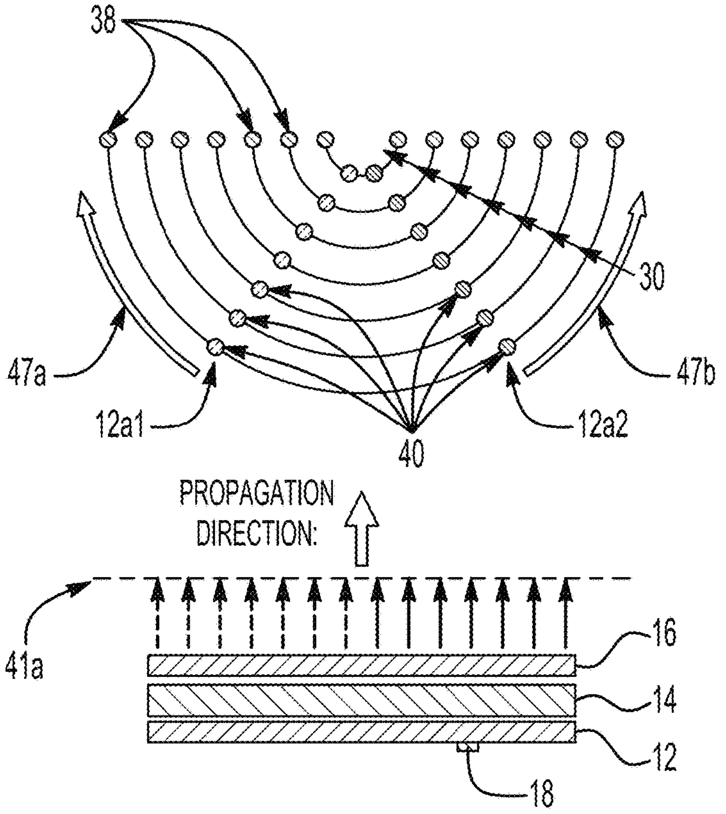
FIG. 5*a* illustrates the orientation of delay lines for boresight beam in accordance with a second embodiment of the invention that does not employ a power split at the transition from the lower feed to the variable delay lines. Fixed delay lines in lower and upper feeds, combined with the variable delay lines as shown, make the total path length to all radiators equal.
Figure 5B:
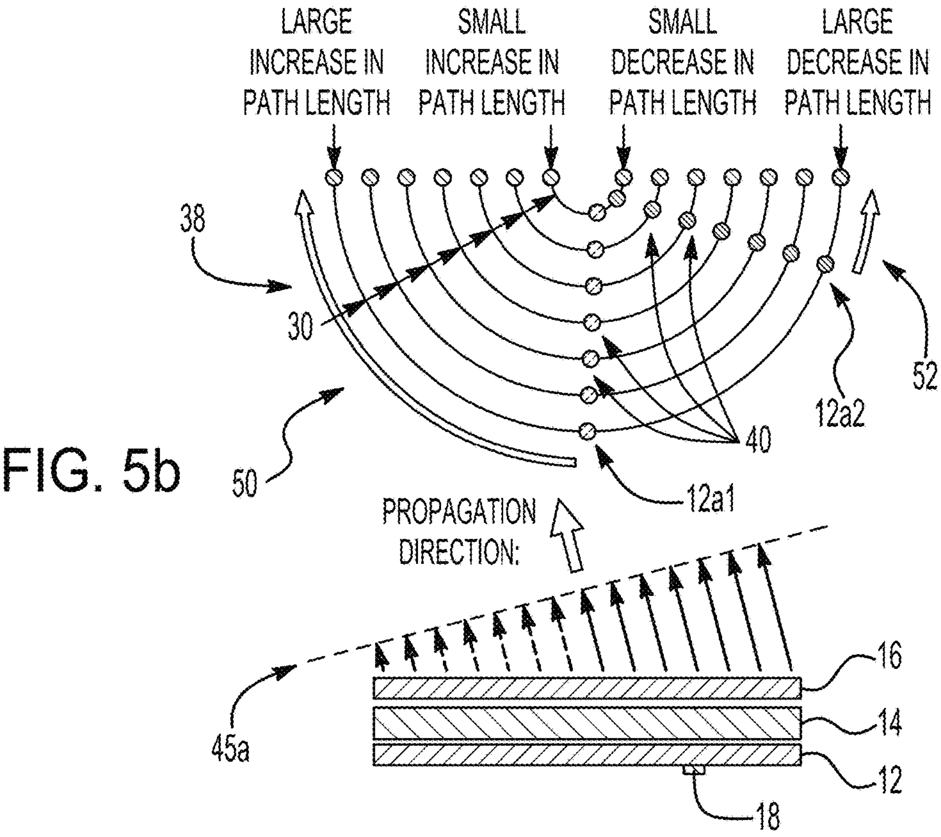
FIG. 5*b* illustrates the orientation of delay lines for scanned beam in accordance with the second embodiment that does not employ a power split at the transition from the lower feed to the variable delay lines. Physical rotation of the upper feed relative to the lower feed changes the path length to all radiators.

FIGS. 5*a* and 5*b* show the architecture of an antenna in accordance with a second embodiment of the invention in which there are no power splits at delay line transitions. The architecture of the second embodiment shown in FIGS. 5*a* and 5*b* is similar to the architecture of the first embodiment and, for sake of brevity, only the differences between the first and second embodiments are discussed here. FIG. 5*a* illustrates orientation of delay lines for boresight beam, where the fixed delay lines in the lower feed 12*a* and the upper feed 14*a* produce equal path lengths to all radiators. This results in a radiated phase front 41*a* (transmit illustrated) that is parallel to the face of the antenna 10, which can be seen in the bottom portion of FIG. 5*a*. The direction of radiation is therefore normal to the face of the antenna. In FIG. 5*a*, the lower layer 12 includes two fixed corporate feeds 12*a*1, 12*a*2 angularly spaced apart from one another by a fixed offset, each connected to a different location along the delay lines 30 (note the two sets of connections 40 on each delay line 30). The fixed delay lines in the lower and upper feeds are configured such that the total path length from the antenna port 18 to each radiator 20 is the same. However, in the embodiment of FIGS. 5*a* and 5*b* there are no power splits at the interfaces 40 between the lower feed 12*a*1, 12*a*2 and the delay lines 30, resulting in the signal propagating in only one direction 47*a*, 47*b* from each connection 40 for a particular operational mode (i.e., transmit mode or receive mode). Because there are two lower feeds 12*a*1, 12*a*2, the lower feed is effectively coupled to two points on each delay line 30 (as opposed to one point for the first embodiment), and each output of the lower feed 12*a*1, 12*a*2 is connected to just one column 21 of radiators 20 (as opposed to two radiators for the first embodiment). Not shown is a simple power divider that equally splits the signal from the antenna port 18 to the two lower feeds 12*a*1 and 12*a*2.

FIG. 5*b* illustrates the orientation of delay lines for scanned beam, where the upper feed 14*a* is physically rotated relative to the lower feeds 12*a*1, 12*a*2. More specifically, upon physical rotation of the upper layer 14 relative to the lower layer 12 in a first direction, for a first region 50 there is a large increase in the path length from "outer" radiators 20 to the connection between the delay lines 30 to the lower feed 12*a*, and a small increase in the path length from "inner" radiators 20 to the connection between the delay lines 30 to the lower feed 12*a*. Conversely, in a second region 52 there is a large decrease in the path length from "outer" radiators 20 to the connection between the delay lines 30 to the lower feed 12*a*, and a small decrease in the path length from "inner" radiators 20 to the connection between the delay lines 30 to the lower feed 12*a*. The resultant radiation direction is skewed to the left (the radiated phase front 45*a* is tilted with respect to the face of the antenna) as shown in the bottom portion of FIG. 5*b*. It is noted that the resulting radiated phase front in both FIGS. 5*a* and 5*b* is formed from components produced by each lower feed 12*a*1, 12*a*2. For example, in the example of FIGS. 5*a* and 5*b* the radiated phase front is represented by fourteen lines emanating from the antenna. The left-most seven lines are primarily the product of the first lower feed 12*a*1, and the right-most seven lines are primarily the product of the second lower feed 12*a*2.

One benefit of this version of the antenna is that the total path length from the antenna port 18 to the radiators 20 can be significantly reduced. Another benefit is that multiple lower feeds with separate antenna ports can be used, thereby partition the antenna into separate regions that can be used for different functions. The regions can have distinct operating bands and/or polarizations.

Figure 6A:
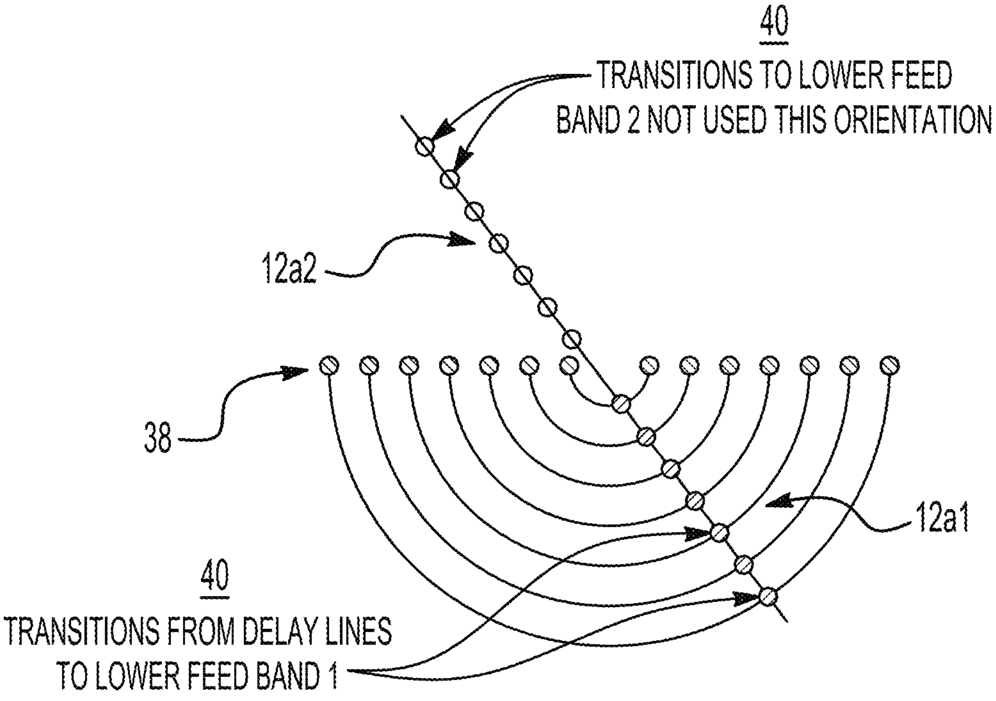
FIG. 6*a* illustrates the orientation of delay lines for operation in a first frequency band in accordance with a third embodiment of the invention, where delay lines are connected to the first band lower feed.
Figure 6B:
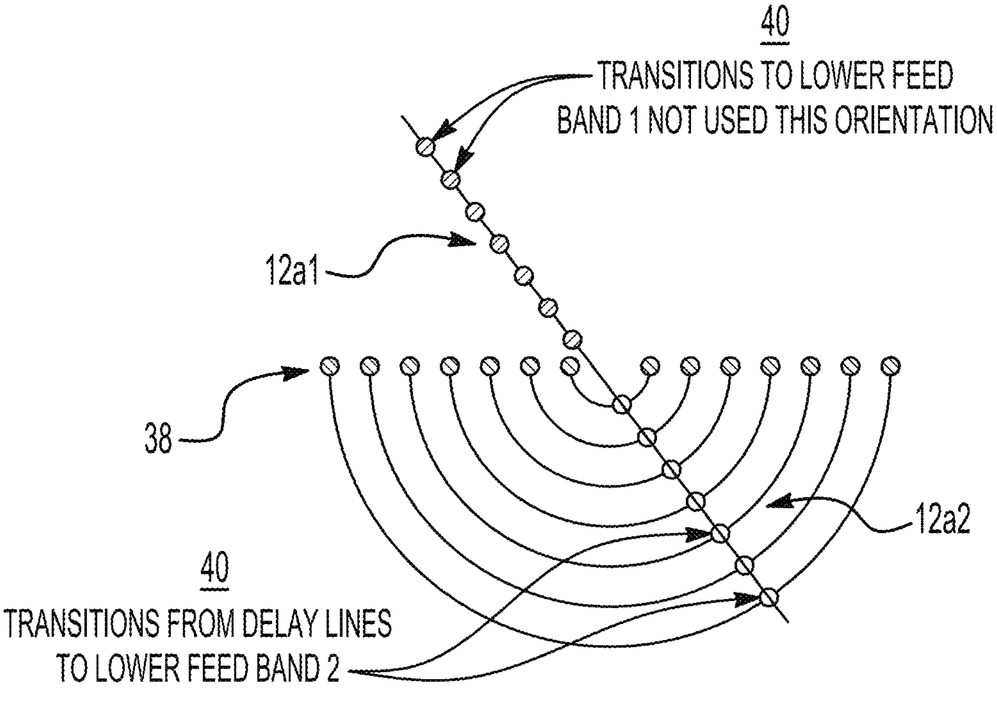
FIG. 6*b* illustrates the orientation of delay lines for operation in a second frequency band in accordance with the third embodiment, where delay lines are connected to the second band lower feed.

Moving now to FIGS. 6*a* and 6*b*, illustrated is the architecture of an antenna in accordance with a third embodiment of the invention that provides dual band operation using separate feeds. The architecture of the third embodiment shown in FIGS. 6*a* and 6*b* is similar to the architecture of the first embodiment and, for sake of brevity, only the differences between the first and third embodiments are discussed here. In the third embodiment, the antenna includes two (or more) lower feeds 12*a*1, 12*a*2, each of which is optimized for a distinct frequency band, e.g., one for Ku band and the other for Ka band. At any given time, only one of the feeds 12*a*1, 12*a*2 is used. The other feed is in a location in which it does not couple to the variable delay lines 30. For example, by rotating the lower layer 12 relative to the upper layer 14, one feed 12*a*1 can be made active while the other feed 12*a*2 can be made inactive. There is a range of about 120 degrees wide for the angle of the lower layer 12 relative to the upper layer 14 at which feed 12*a*1 couples to the delay lines 30. There is another range of about 120 degrees wide for the angle of the lower layer 12 relative to the upper layer 14 at which feed 12*a*2 couples to the delay lines 30. At angles outside these two ranges, neither feed 12*a*1, 12*a*2 is sufficiently coupled to the delay lines 30 to enable operation.

FIG. 6*a* illustrates the orientation of delay lines for frequency band 1 operation. In FIG. 6*a*, the feed 12*a*1 (shown in the lower right of the figure) is "active" and the feed 12*a*2 (shown in upper left of the figure) is "dormant". FIG. 6*b* illustrates the orientation of delay lines for frequency band 2 operation. In 6*b*, the feed 12*a*2 (shown in the lower right of the figure) is "active" and the feed 12*a*1 (shown in upper left of the figure) is "dormant". By selectively placing one of the feeds in an active position and the other of the feeds in a dormant position, the antenna of FIGS. 6*a* and 6*b* can switch between different frequency bands.

Each of the disclosed embodiments can include other attributes. For example, each embodiment may have multiple active and multiple dormant feeds, and/or may or may not partition the antenna into separate regions (subsets of the radiators connected to distinct ports). Further, one or more embodiments may have two sets of interleaved variable delay lines and two sets of interleaved upper feeds, which can provide simultaneous dual polarization.

For each of the disclosed embodiments, scanning can be performed with either clockwise or counterclockwise rotation. This implies that the beam can be scanned through θ=0 smoothly (the rotation direction does not need to be changed when the beam passes through θ=0), and at most ±1 radian of relative rotation is employed to scan the over a full hemisphere. Additionally, amplifiers can be embedded in the antenna. This is done primarily to reduce the effect of loss.

Figure 3B:
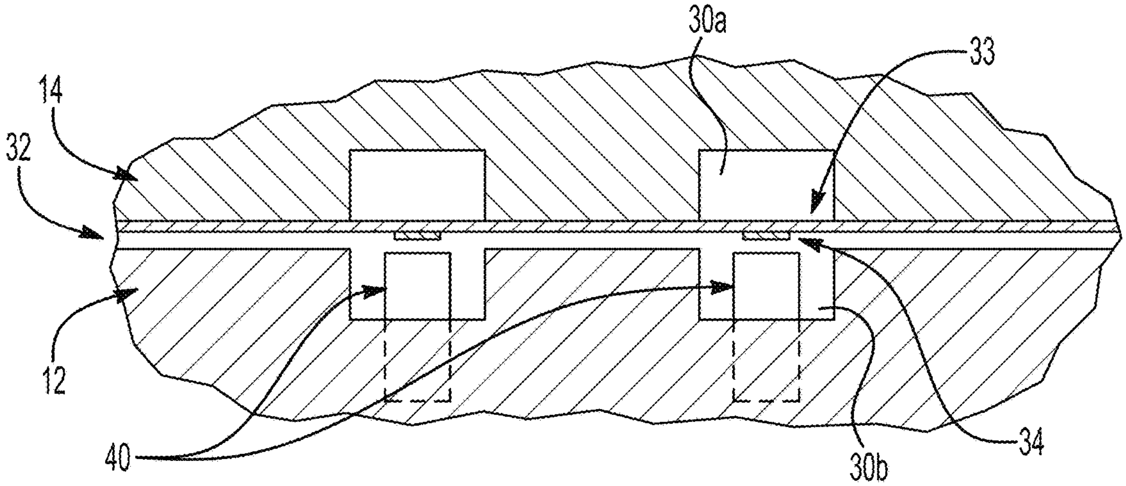
FIG. 3*b* illustrates a cross section of the variable time delay lines formed by grooves in the upper and lower layers.
Figure 7A:
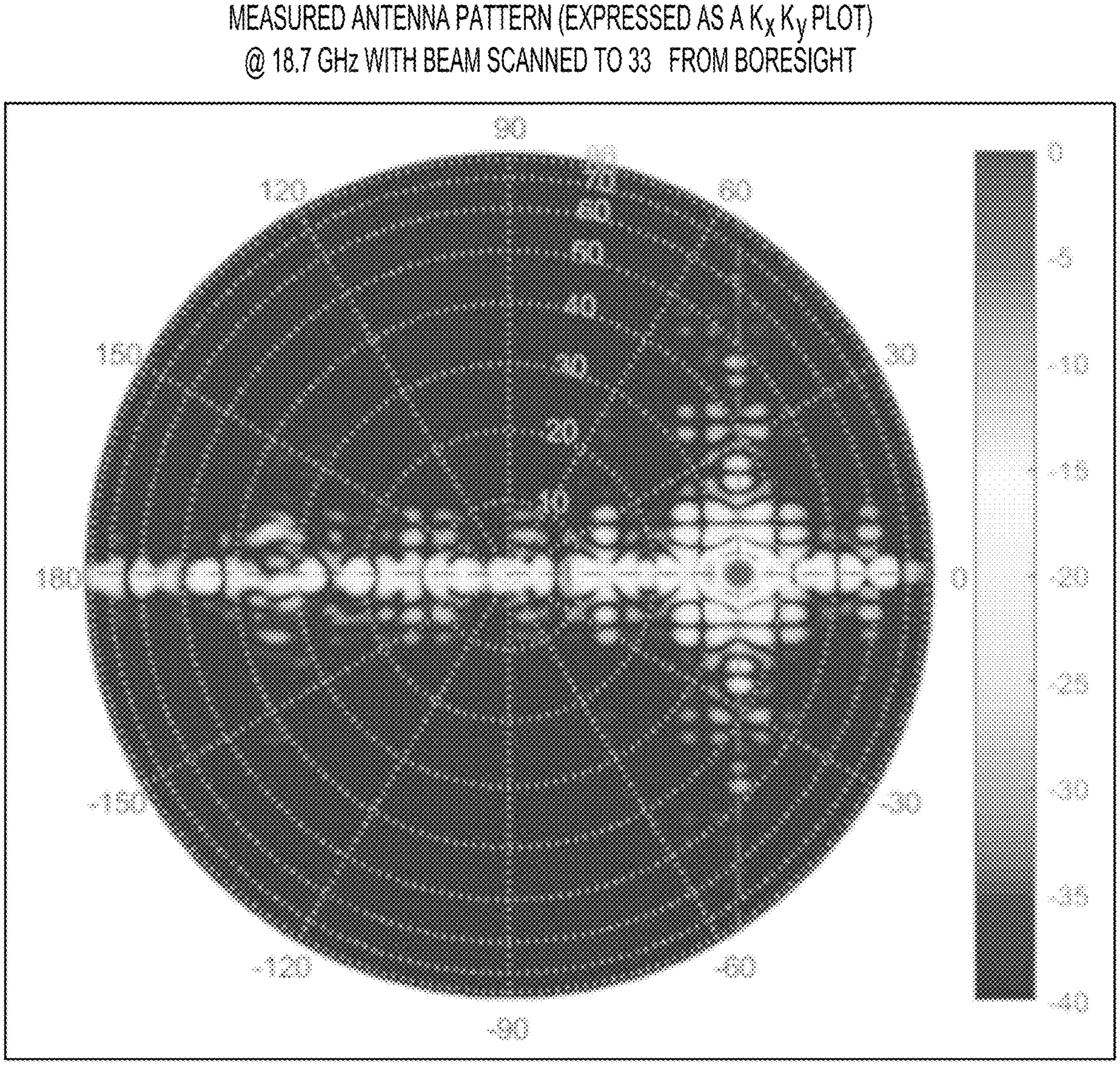
FIG. 7*a* shows a measured hemispherical antenna pattern of a K-band prototype that was reduced to practice.
Figure 7B:
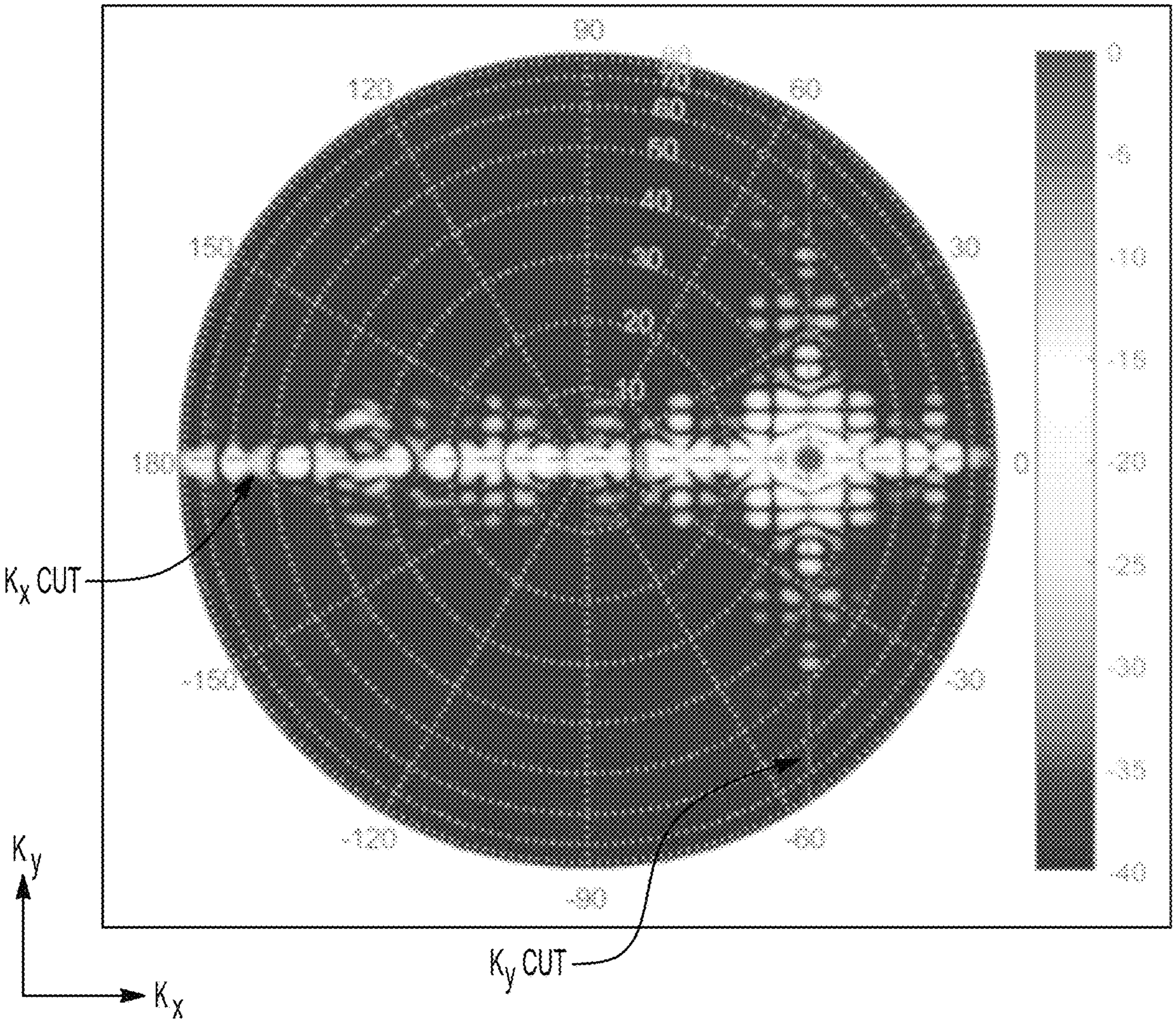
FIG. 7*b* provides the same hemispherical antenna pattern provide in FIG. 7*a* with additional notations for explaining 2-dimensional antenna pattern cuts provided in FIGS. 8-10.
Figure 8A:
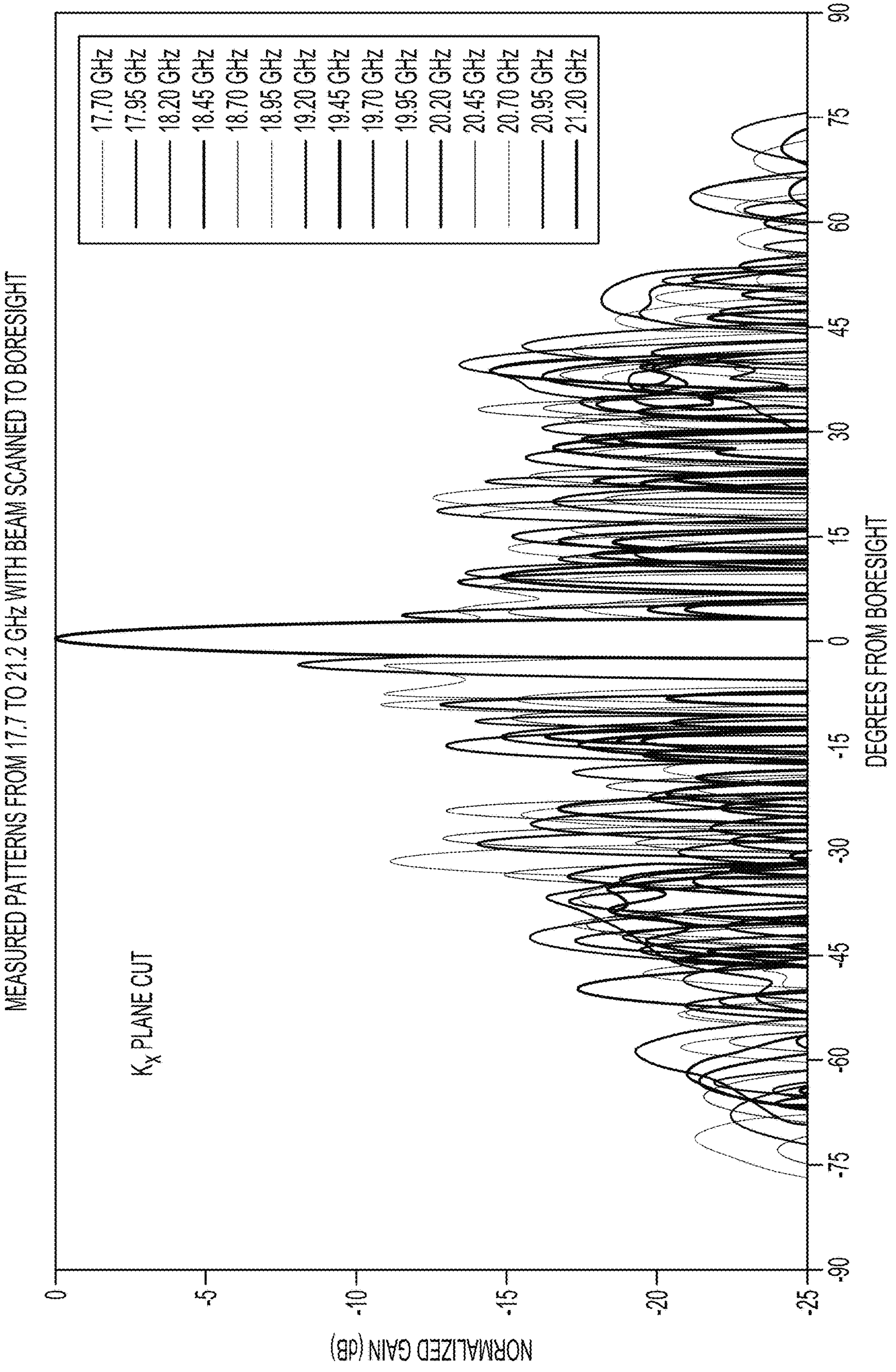
FIGS. 8*a* and 8*b* show 2-dimensional antenna pattern cuts at boresight (θ=0) in the Kx and Ky planes at 15 different frequencies across the measured frequency band of 17.7 to 21.2 GHz for the K-band prototype.
Figure 8B:
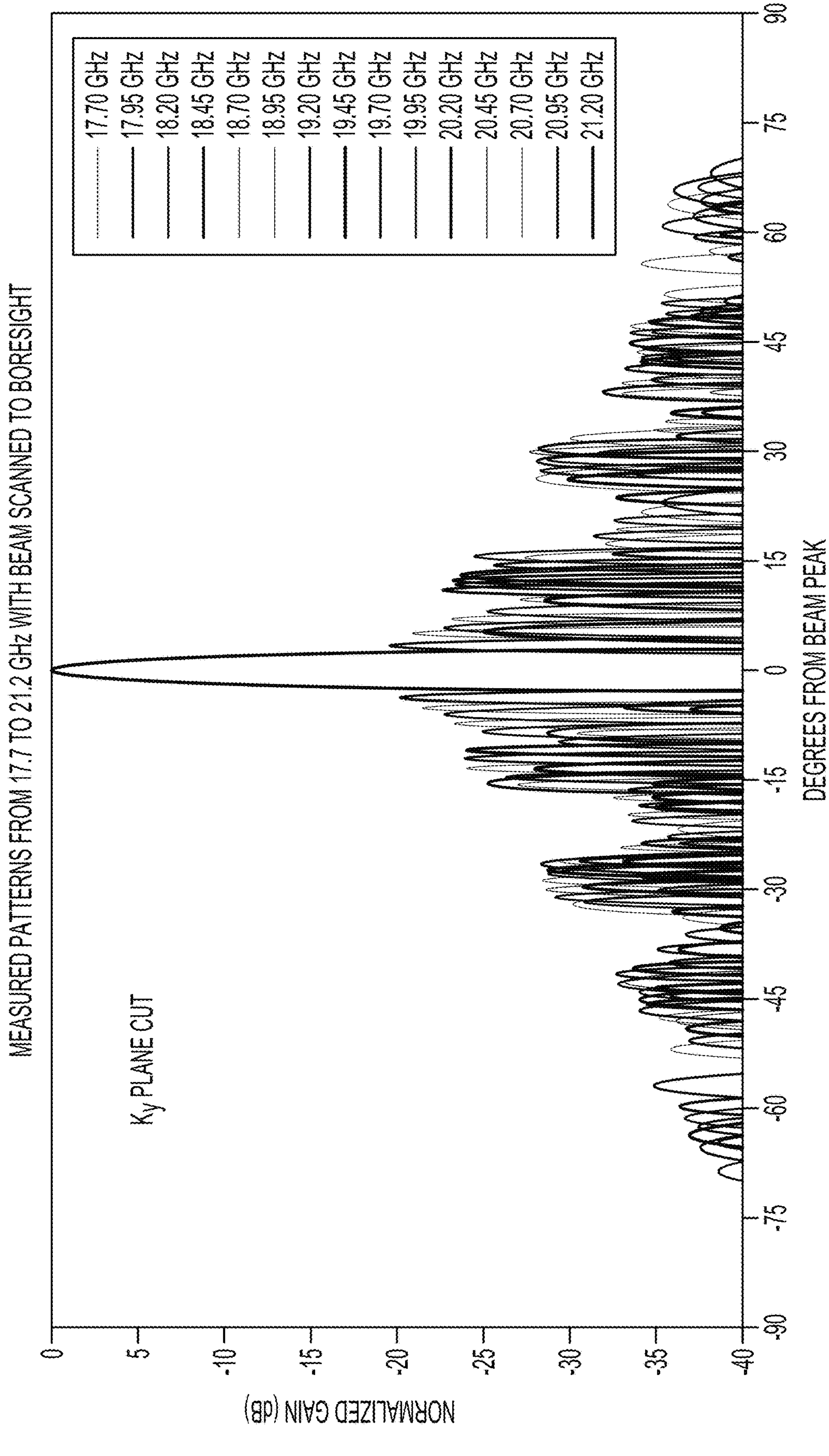
Figure 9A:
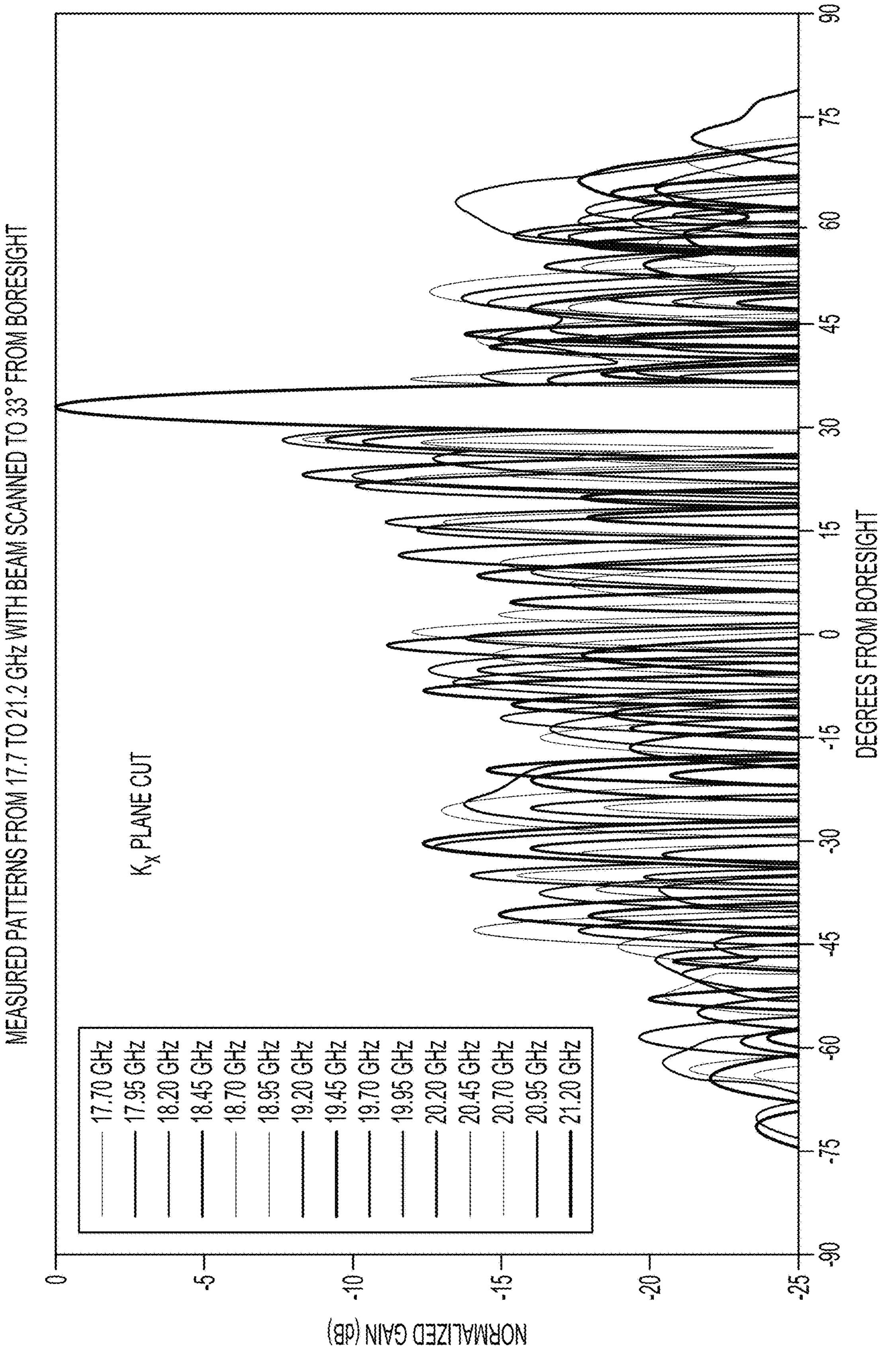
FIGS. 9*a* and 9*b* show 2-dimensional antenna pattern cuts at θ=33° in the Kx and Ky planes at 15 different frequencies across the measured frequency band of 17.7 to 21.2 GHz for the K-band prototype.
Figure 9B:
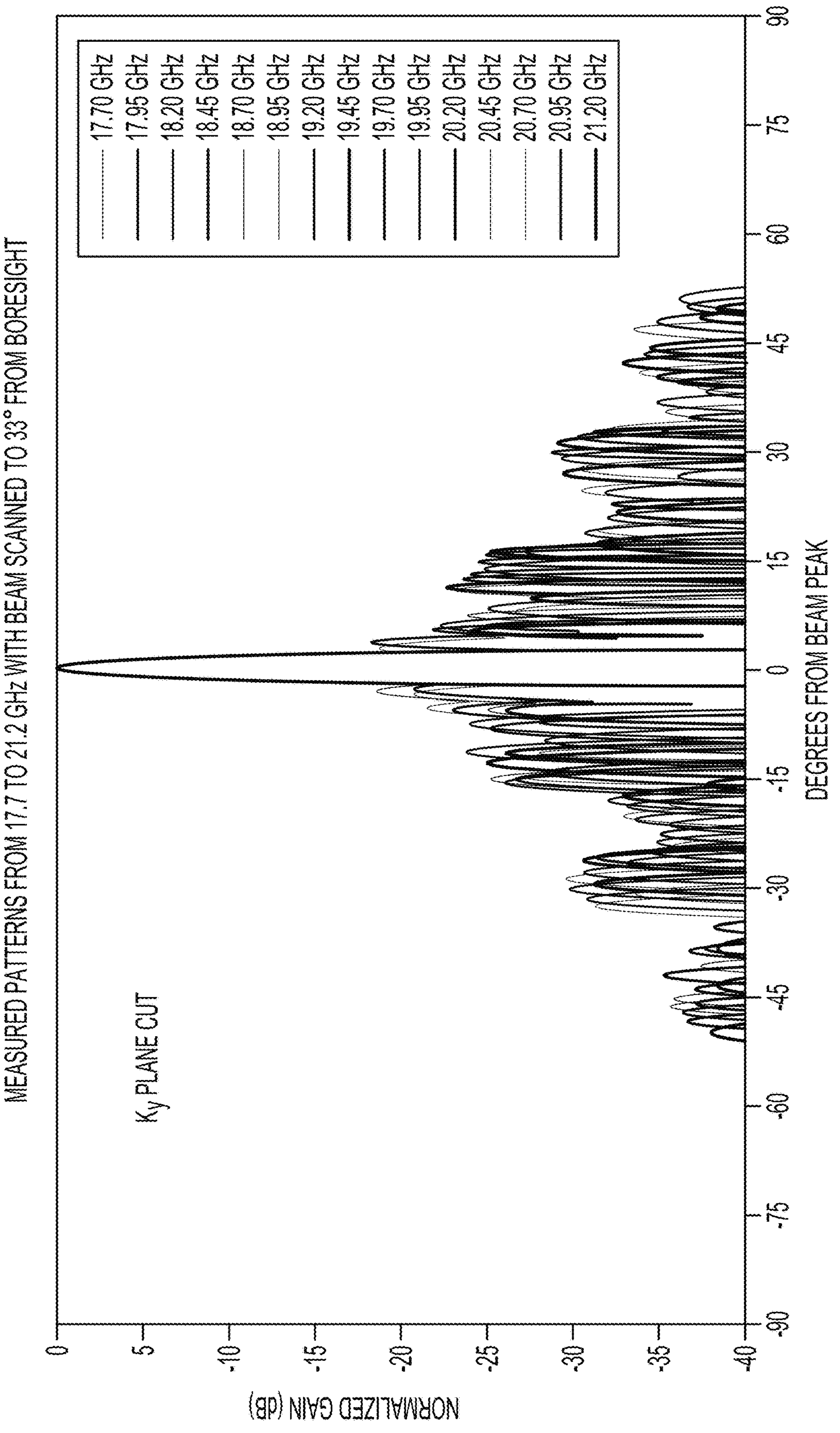
Figure 10A:
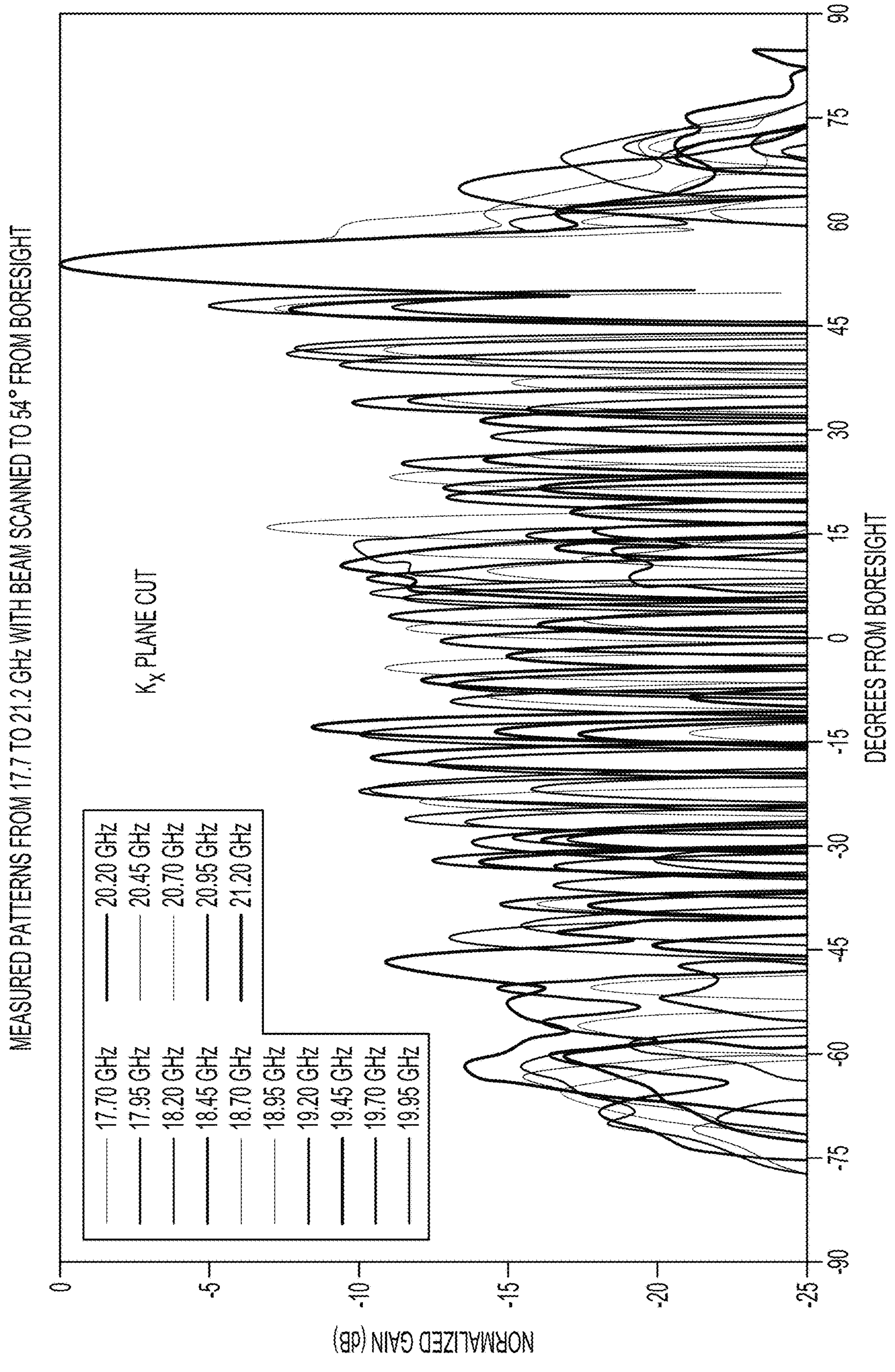
FIGS. 10*a* and 10*b* show 2-dimensional antenna pattern cuts at θ=54° in the Kx and Ky planes at 15 different frequencies across the measured frequency band of 17.7 to 21.2 GHz for the K-band prototype.
Figure 10B:
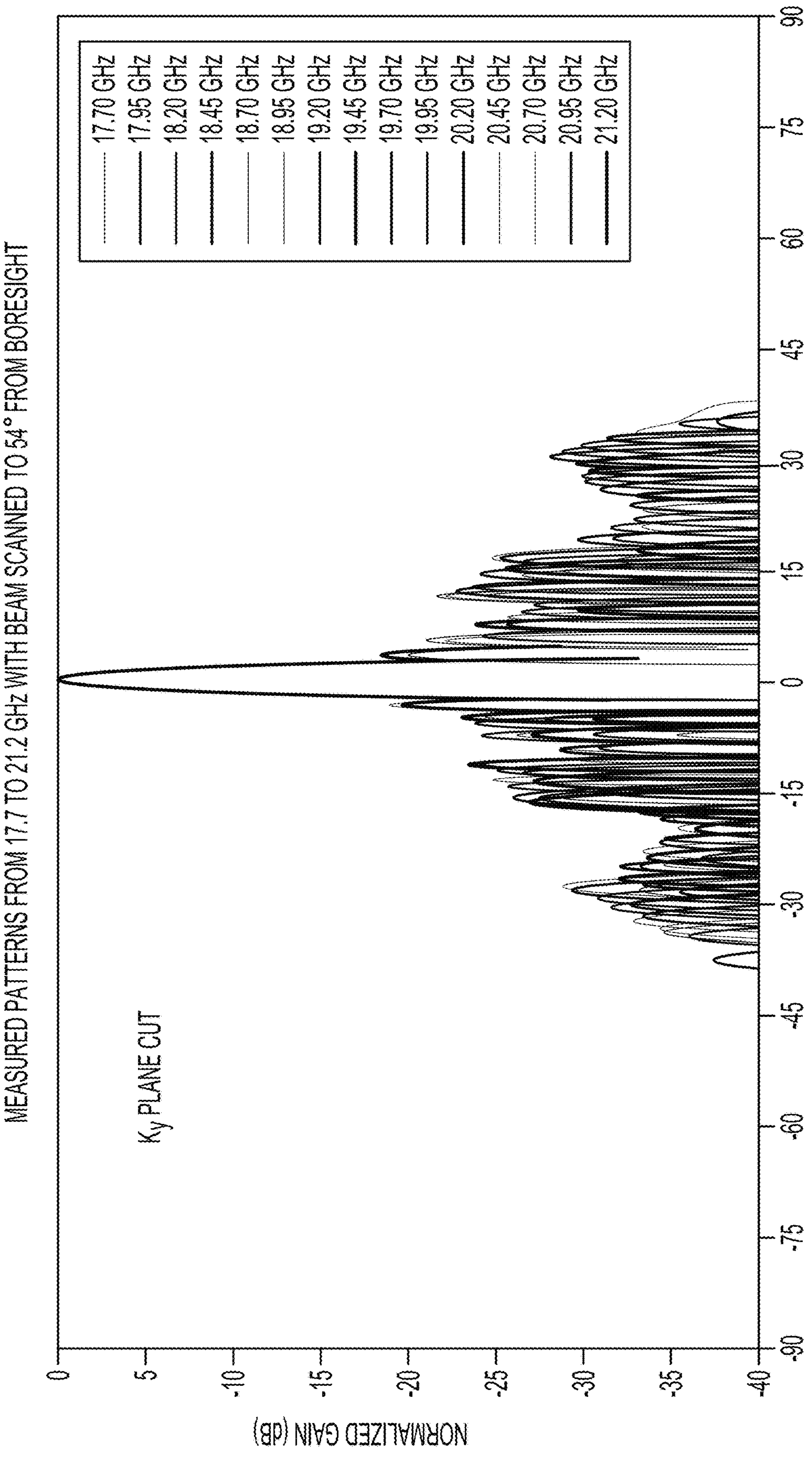

The embodiment described in FIGS. 3*a* and 3*b* has been successfully reduced to practice via a prototype antenna designed to operate over the frequency range of 17.7-21.2 GHz. FIG. 7*a* shows measured pattern data @ 18.7 GHz, expressed as a KxKy plot. FIG. 7*b* illustrates which pattern cuts are shown in FIGS. 8*a*-10*b*. The patterns referred to as Kx plane cuts cover the angles shown by the horizontal grey dotted line in FIG. 7*b*. The patterns referred to as Ky plane cuts cover the angles shown by the vertical red dotted line in FIG. 7*b*. These cuts cover the main sidelobe ridges of the complete (2D) antenna patterns. The x-axis in the Kx plane cuts is degrees from boresight, while the x-axis in the Ky plane cuts is degrees from the beam peak. The data for each of the figures was taken with a different value for the relative angle of the antenna layers. The data clearly show that the beam angle is independent of frequency, demonstrating a key attribute of the invention. Note that the antenna was not designed for good sidelobe performance. This prototype was intended only as a proof of concept to demonstrate a scannable antenna with a frequency independent scan angle.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A scanning true time delay antenna, comprising:

a first layer including at least one first corporate feed having a first port and a plurality of second ports communicatively coupled to the first port;

a second layer disposed over the first layer and rotatable relative to the first layer, the second layer including a plurality of second corporate feeds each having a third port and a plurality of fourth ports communicatively coupled to the respective third port, and a plurality of radiators, wherein each of the plurality of radiators is communicatively coupled to a respective one of the plurality of fourth ports; and a plurality of first variable time delay lines arranged at least partially in at least one of the first layer or the second layer, wherein each of the plurality of second ports is communicatively coupled to a respective one of the plurality of first variable time delay lines, and each third port is communicatively coupled to a respective one of the plurality of first variable time delay lines, wherein rotation of the second layer relative to the first layer creates a linear progressive length change from the first port to each of the radiators.

2. The antenna according to claim 1, further comprising a plurality of transitions connecting each of the plurality of second ports to a respective one of the plurality of first variable time delay lines, the transitions operative to communicate a signal between each second port and the respective first variable time delay line.

3. The antenna according to claim 2, wherein the transitions comprise a first set of transitions and a second set of transitions.

4. The antenna according to claim 3, where the first and second set of transitions employ coaxial transmission lines or waveguides.

5. The antenna according to claim 2, wherein the at least one first corporate feed comprises at least two corporate feeds angularly spaced apart from one another, wherein the first set of transitions is associated with one of the at least two first corporate feeds, and the second set of transitions is associated with another one of the at least two first corporate feeds.

6. The antenna according to claim 5, where the first set of transitions and associated one of the at least two corporate feeds are tuned for a first frequency band, and the second set of transitions and the associated another of the at least two corporate feeds are tuned for a second frequency band different from the first frequency band.

7. The antenna according to claim 5, wherein the at least two corporate feeds are configured to be independently placed in an active state or a dormant state to receive or transmit in one of the distinct frequency bands.

8. The antenna according to claim 2, further comprising a power splitter arranged at each respective transition, the power splitter configured to direct half of the power from each of the plurality of second ports to propagate in a first direction along the respective one first variable time delay line, and to direct the other half of the power from each of the plurality of second ports to propagate in a second direction along the respective one first variable time delay line, the second direction different from the first direction.

9. The antenna according to claim 1, further comprising a polarizer disposed over the second layer.

10. The antenna according to claim 1, where the plurality of first variable time delay lines, the at least one first corporate feed, and the plurality of second corporate feeds are constructed from at least one of stripline, microstrip, and waveguide structures.

11. The antenna according to claim 1, comprising a plurality of second variable time delay lines interleaved with the plurality of first variable time delay lines and wherein the upper layer includes a plurality of third corporate feeds interleaved with the plurality of second corporate feeds to provide simultaneous dual polarization.

12. The antenna according to claim 1, further comprising an antenna port arranged on the first layer, wherein the first port of the at least one first corporate feed is communicatively coupled to the antenna port.

13. The antenna according to claim 1, wherein the plurality of first variable time delay lines radially span from the center of the antenna toward a perimeter of the antenna.

14. The antenna according to claim 1, wherein the plurality of first variable time delay lines are at least partially contained within the first layer and at least partially contained within the second layer.

15. The antenna according to claim 1, wherein the plurality of first variable time delay lines are fully contained within one of the first layer or the second layer.

16. The antenna according to claim 1, wherein the plurality of first variable time delay lines are formed as stripline, microstrip, or waveguides.

17. The antenna according to claim 1, wherein the plurality of first variable time delay lines comprise a first conductive groove formed in the first layer and a second conductive groove formed in the second layer, the first and second grooves facing each other and aligned with each other to define a channel.

18. The antenna according to claim 1, further comprising an air gap disposed between the first layer and the second layer.

19. The antenna according to claim 1, wherein each of the plurality of second ports is communicatively coupled to a single column of radiators.

20. The antenna according to claim 1, wherein each one of the plurality of second feeds and the radiators coupled to the respective second feed forms a column of radiators.

21. A method of implementing scanning true time delay using an antenna having a first layer and a second layer rotatable relative to the first layer, the first layer including an antenna port and a first corporate feed and the second layer including a plurality of second corporate feeds and a plurality of radiators, each second corporate feed comprising a column of radiators, the method comprising:

- receiving a signal at the antenna port of the first layer;
- communicating the received signal to the plurality of radiators of the second layer through the first corporate feed and the plurality of second corporate feeds, the first corporate feed coupled to the plurality of second corporate feeds through a plurality of first variable time delay lines formed in at least partially in one of the first layer or the second layer; and
- rotating the second layer relative to the first layer to alter the delay time from the antenna port to each of the plurality of radiators.

* * * * *